3,206,423
METHOD OF OBTAINING WATER-INSOLUBLE HOMOPOLYMERS OF VINYL-OXAZOLIDINONE
Wilhelm E. Walles, Midland, Mich., assignor to The Dow Chemical Company, Midland, Mich., a corporation of Delaware
No Drawing. Filed Mar. 8, 1961, Ser. No. 94,154
6 Claims. (Cl. 260—29.6)

This invention concerns certain new water-insoluble polymeric products and a method of obtaining the same. It pertains, more particularly, to water-insoluble homopolymers of N-vinyl-2-oxazolidinone (which is also known as N-vinyl-2-oxazolidone and is hereinafter abbreviated as "VO") and to a method whereby these water-insoluble homopolymeric products can be separated from apparently quite highly water-soluble more complex mixtures of the same together with corresponding lower molecular weight hompolymers which are truly water-soluble.

The term "water-insoluble" is employed herein in its usual practical sense of meaning not soluble in water to more than a slight extent. Polmers which cannot be dissolved in distilled or demineralized water to form a dilute solution thereof, i.e. within the range of from 0.02 to 5 weight percent concentration at 25° C., are regarded herein as being water-insoluble.

For convenience, the homopolymers of VO are hereinafter referred to, in abbreviated form, as "PVO."

Ways of making the polymerizable compound, VO, are described in U.S. Patents 2,818,362 and 2,891,058. The Patent 2,818,362 also discloses homopolymers, and a variety of copolymers, of VO and ways of making the same. The homopolymers are referred to therein as being soluble both in water and benzene. The homopolymerization of VO can be carried out in any of the ways usual in polymerizing other readily polymerizable vinylidene compounds, e.g. it can be accomplished en masse, or in solution in water or other suitable solvent, under the action of light, heat, or in the presence of a polymerization catalyst such as alpha,alpha-azo-bis-isobutyronitrile, hydrogen peroxide, or barium peroxide or other inorganic peroxides, or one or more organic peroxy compounds such as benzoyl peroxide, lauroyl peroxide, ditertiary-butyl peroxide, etc., or by any combination of such polymerization conditions. The polymeric product obtained by homopolymerization of VO under any of the polymerization conditions just-mentioned is usually composed of polymer molecules of various molecular weights and the molecular weight, as usually determined for such a product, is an average value for the product as a whole. This average molecular weight value for the product is dependent upon the polymerization conditions employed in forming the same. For instance, an increase in the polymerization temperature, or the addition of a catalyst to increase the rate of polymerization at a given temperature, usually causes a decrease in the average molecular weight of the polymeric product. Other ways of varying polymerization conditions to alter, or control, the average molecular weight of a polymer being formed are well known in the art and can be applied in carrying out the homopolymerization of VO. Drechsel, in J. Org. Chem. 22, 849–851 (1957), describes the preparation of PVO having a molecular weight of about 1250, as determined by microisopiestic measurements, and sets forth that additional VO polymerizations indicated that homopolymers of molecular weight ranging from 450 to over 100,000 can be formed. He teaches that all of the products were water-soluble.

It has now been found that the homopolymers of VO having molecular weights of 18,000 and above are water-insoluble, but that they can be rendered water-soluble, by having PVO of lower molecular weights mixed together therewith. The average molecular weight of the water-soluble PVO mixture, comprising PVO molecules of molecular weights ranging from below to above 18,000, may be of any value within a range of from about 12,000 to considerably above 18,000. It has been observed that PVO, when composed of a mixture of homopolymer molecules of molecular weights ranging from well below 18,000 to well above 18,000, i.e. comprising both water-soluble and water-insoluble polymer molecules, is often compatible with water to form what appear to be fairly concentrated homogenous solutions thereof, e.g. of 20–50 weight percent concentration or higher, and, in view of this, might be regarded as being quite highly soluble in water. However, it has further been found that when such a fairly concentrated aqueous apparent solution of such homopolymer mixture is diluted with water in amount bringing the average concentration of PVO in the resulting system down into the range of 17 weight percent and lower, the mixture separates into layers. The lower layer of the resulting mixture is rich in water-insoluble PVO having water dissolved therein, presumably as water of hydration, e.g. to form PVO hydrates. The water present in the lower layer may be, and usually is, sufficient to liquefy at room temperature the PVO present in said layer. The PVO contained therein is composed for the most part of homopolymer molecules which, on an anhydrous basis, have molecular weights of 18,000 or higher, as determined by the method described by P. J. Flory on pages 309–310 of his book "Principles of Polymer Chemistry," published in 1953 by the Cornell University Press of Ithaca, N.Y. However, said lower layer sometimes retains a small proportion, usually 10 weight percent or less, based on the total amount of PVO present, of water-soluble PVO of molecular weights less than 18,000. The upper layer of the mixture is an aqueous solution containing a higher ratio by weight of the lower molecular weight water-soluble PVO, relative to the higher molecular weight water-insoluble PVO, than was present in the PVO starting material. The PVO in such upper layer may have an average molecular weight value in a range of from below to far above 18,000.

The PVO which is employed as a starting material in the method of the invention is of a quality obtainable by ordinary polymerization methods, such as those hereinbefore mentioned. It has a Fikentscher K value (discussed below) of 15 or above and it comprises homopolymeric molecules of widely varying molecular weights, inclusive of PVO molecules of molecular weights both below and above 18,000. Its average molecular weight may be of any value from considerably lower than 18,000, e.g., 12,000 or thereabout, to much higher than 18,000, e.g. 1,000,000 or higher. When dry, it is usually a solid material, but it is capable of being dissolved in water to form fairly concentrated solutions thereof, e.g. of 20 weight percent concentration and higher.

The K values herein mentioned, are indirect expressions of the average molecular weights of the respective portions of PVO being discussed. K is determined as described by Fikentscher in Cellulosechemie 13, 60 (1932), and becomes larger with increase in the average molecular weight values, e.g. of batches of PVO.

The present method for obtaining a water-insoluble PVO product amounts, in effect, to an extraction of water-soluble PVO from such PVO starting material by use of an amount of water sufficient to overcome, to an extent resulting in layer formation, the tendency of low molecular weight and high molecular weight PVO molecules to be mutual solvents for one another.

The purpose of the invention can, if desired, be accomplished by such a direct water-extraction procedure. In this mode of practicing the invention, the finely divided PVO starting material is agitated with liquid water in amount corresponding to about 83 percent or more, advantageously from 85 to 98 and preferably from 87 to 95 percent, of the total weight of the aqueous mixture. The extraction is usually carried out at room temperature or somewhat above, but it can be accomplished at any temperature in the range of from 0° C. to approximately the atmospheric boiling point of water, e.g. 99° C. At the higher temperatures within this range, a somewhat larger proportion of the PVO of molecular weights higher than 18,000 tends to be retained in the resulting upper layer of the aqueous solution of the lower molecular weight, water-soluble PVO than at the lower temperatures in said range. In most instances, the extraction is advantageously carried out at final extraction mixture temperatures of between about 15° and 75° C. using water in a proportion corresponding to from 87 to 95 percent of the weight of the mixture. For purposes of increasing the rate of extraction, the mixture can be heated to above the preferred temperature range just-mentioned, e.g. to 90–100° C. or even to higher temperatures at superatmospheric pressure if desired, during agitation of the mixture and thereafter be cooled to the lower and more desirable temperatures prior to separating the two layers of the resulting mixture.

The mixture is then permitted to settle into layers and the layers are separated. As hereinbefore-mentioned, the upper layer is an aqueous solution of the lower molecular weight, water-soluble PVO. It usually retains a portion of the PVO molecules, of molecular weights higher than 18,000, dissolved therein, but by adding a sufficiently large amount of water thereto, or by evaporating said layer to concentrate the PVO therein and again extracting the latter with water, a further amount of the higher molecular weight PVO may be removed therefrom. In any such case, the upper layer may be dried, preferably by moderate heating under vacuum, to obtain a residue of PVO of a quality readily soluble in water to form either concentrated or dilute aqueous solutions thereof. This water-soluble PVO has been found to be somewhat more effective, as an agent for treating beer or other beverages to coagulate suspended impurities and thus clarify the beverage, than is either the PVO starting material, such as was subjected to the extraction, or the higher molecular weight, water-insoluble PVO removed from the starting PVO by the extraction.

The lower layer of the mixture resulting from the extraction operation is water-insoluble and is fairly rich in water-insoluble PVO which, when dried, is solid. However, said lower layer usually contains sufficient water, presumably absorbed, e.g. as water of hydration, in the relatively high molecular weight, water-insoluble PVO present, to render the lower layer a liquid at the temperatures employed in carrying out the extraction. This lower layer may be dried, e.g. by moderate heating under vacuum, to remove the water and obtain a residue of the water-insoluble PVO product in solid form.

On a dry basis, the water-insoluble PVO product thus-obtained has an average molecular weight above 18,000 e.g. of from 18,000 to 250,000 or higher, and is nearly free, e.g. contains less than 10 weight percent, of polymer molecules having molecular weights of less than 18,000. If necessary, it can be further purified, i.e. be rendered more nearly free of water-soluble polymer molecules, by again subjecting it to an extraction with water. As herein before indicated, it is useful as an agent which may be added, suitably dissolved or in finely divided form, to beer to clarify the latter, but for this purpose it is less effective than the lower molecular weight PVO from which it was separated. It is also useful as a dye-receptive additive which may be incorporated, in minor amounts, together with synthetic resins, such as polyacrylonitrile or vinyl chloride-vinylidene chloride copolymers, to render fibers or fabrics of such synthetic resins more readily dyeable. For this purpose, the water-insoluble PVO provided by the invention is advantageous over the water-soluble PVO, in that it is less readily removable from the fiber or fabric by washing with water. Accordingly, the water-insoluble PVO provided by the invention constitutes a new and useful product.

Although the water-insoluble PVO can be obtained by a direct extraction of water-soluble PVO from the PVO starting material, as described above, it is more readily and conveniently obtained by dissolving the PVO starting material in a limited amount of water, e.g. to form a solution of the PVO starting material of about 20 weight percent concentration or higher, and thereafter admixing sufficient water with the solution to bring the average concentration of PVO in the mixture as a whole to within the range of 17 weight percent or less, advantageously from 2 to 15 percent, and preferably to within a range of from 5 to 13 percent by weight. This further dilution of the mixture causes separation of a distinct lower layer of the water-insoluble, higher molecular weight PVO, having a considerable amount of water absorbed therein, so that the overall effect obtained up to this point in the process is substantially the same as that obtainable by the direct water-extraction procedure described above. However, the preferred procedure just-described can more conveniently and rapidly be carried out than can the direct water extraction procedure. This preferred procedure can be carried out at temperatures similar to those mentioned in the above description of the direct water-extraction procedure. After thus causing the aqueous mixture to stratify into layers in the preferred manner just set forth, the layers can be separated and be dried, as above-described in connection with the direct water-extraction procedure, to obtain separate bodies of water-soluble PVO and of water-insoluble PVO as distinct products.

Each of the above-described procedures for practice of the invention not only is effective in causing separation of the lower molecular weight, water-soluble PVO and the higher molecular weight, water-insoluble PVO, from one another, but also usually causes a removal of any impurities, e.g. such as soluble salts or soluble organic impurities, present in the PVO starting material, from one of the products, in most instances minor amounts of soluble salts present, when in the PVO starting material, tend to be retained for the most part in the upper layer resulting from either such treatment of the PVO starting material with the aforementioned amounts of water. As a result, the higher molecular weight PVO in the lower layer is relatively free of the salt impurity, i.e. it is obtained in purified condition. There may be instances, depending upon the kind of impurity, if any, present in the PVO starting material, in which the impurity will tend to be retained for the most part in the lower, rather than the upper, layer. However, in instances in which the PVO starting material contains impurities, the process of the invention usually results not only in separation of the water-soluble PVO starting material into a fraction of a relatively low average molecular weight water-soluble PVO product and of a higher average molecular weight water insoluble PVO product, but in retention of a major amount of the impurity in only one of these products so that the other is obtained in a purified condition.

In practice of the invention in accordance with either of the procedures described above, it is desirable that the water employed be free, or nearly free, of dissolved inorganic salts, particularly alkali and alkaline earth metal salts, since the higher molecular weight PVO molecules are far more soluble in aqueous inorganic salt solutions than in water alone and the presence, in appreciable amount, of one or more soluble inorganic salts, e.g. ammonium, sodium, potassium, lithium, calcium, barium or strontium salts, may prevent separation of the dilute aqueous PVO starting material into layers. The presence in the water of very small proportions, e.g. up to a total concentration of 0.05 normal or lower, of one or more dissolved inorganic salts can often be tolerated in practice of the invention. However, the separation of water-insoluble higher molecular weight PVO from the starting PVO material comprising the same and water-soluble PVO of lower molecular weights becomes more complete, under a given set of operating conditions, with decrease in the salt content of the batches of water employed in carrying out such separation in accordance with the method of the invention. Accordingly, water of high purity, e.g. distilled or demineralized water, is preferably employed in practice of the method of the invention.

The new water-insoluble PVO products obtained by the method of the invention can, when desired, be dissolved by employing an aqueous inorganic salt solution as a solvent. Aqueous solutions of one or more alkali salts and/or alkaline earth metal salts, e.g. of $NH_4Cl$, $(NH_4)_2SO_4$, $NH_4NO_3$, $NaCl$, $Na_2SO_4$, $NaNO_3$, $KCl$, $K_2SO_4$, $KNO_3$, $LiCl$, $LiNO_3$, $CaCl_2$, $Ca(NO_3)_2$, $BaCl_2$, $Ba(NO_3)_2$, $SrCl_2$, or $Sr(NO_3)_2$, etc., may be used to dissolve the water-insoluble PVO products. In general, the concentration of salt in such aqueous salt solution necessary for rendering water-insoluble PVO soluble therein becomes somewhat greater with increase in the average molecular weight of the PVO to be dissolved. For instance, an aqueous solution of sodium chloride in 0.3 weight percent concentration, i.e. of 0.05 normality, is capable at room temperature of dissolving water-insoluble PVO of average molecular weight in the order of 18,000–20,000 or somewhat higher to form dilute, e.g. 1–5 weight percent, solutions of the PVO and an aqueous solution of sodium chloride of 0.5 weight percent concentration (0.09 normality) is capable at room temperature of dissolving water-insoluble PVO of much higher molecular weights, e.g., in the range of 30,000 to 70,000 or higher, to form dilute PVO solutions. When an aqueous solution of water-insoluble PVO is desired, an aqueous solution of one or more alkali or alkaline earth metal salts in a total concentration of at least 0.05 normal, and preferably of 0.17 normality or higher, is used as the solvent. Such aqueous salt solutions of the higher molecular weight, water-insoluble PVO products are useful for a number of purposes, e.g. as agents for the treatment of cloudy beverages to clarify the same and as agents for incorporation together with fiber-forming polymeric resins, such as polyacrylonitrile or vinyl chloride-vinylidene chloride copolymers to render fibers and fabrics of the thus-treated resins receptive to dyestuffs, i.e. more readily dyeable than when not treated with the PVO.

The following examples, which describe ways for practice of the invention, are not to be construed as limiting the invention.

EXAMPLE 1

This example describes a series of experiments in which separate portions of a PVO starting material, obtained by a conventional homopolymerization of VO and having a Fikentscher K value of 21, were admixed with several different proportions of demineralized water; each mixture was sealed in a graduated glass container, so as to prevent loss of water by evaporation; was thoroughly shaken in the container; and was then maintained, without shaking, in the container for one hour at the temperature indicated in the following table. Each container had 10 cc. of the aqueous PVO mixture therein. While at the respective temperatures just-mentioned the resulting aqueous mixtures were examined. In certain of the experiments, a single clear homogeneous solution, free of undissolved PVO, was present in a container at the time of the examination. In other experiments, the containers each contained two layers of clear liquids, the upper layer being an aqueous solution of water-soluble PVO containing a higher weight ratio of PVO of molecular weights below 18,000 relative to PVO of molecular weights above 18,000 than in the starting PVO material and the lower layer being of water-insoluble PVO, composed principally of PVO molecules of greater than 18,000 molecular weight and having water absorbed therein. In instances in which the mixture formed two such liquid layers, the volume of the lower layer was measured. In still other of the experiments, the aqueous mixture in a container was of cloudy appearance at the time when examined. This indicated that a small amount of PVO remained undissolved, as a cloudy suspension, in the aqueous PVO solution which was formed. The following table gives the percent by weight of the PVO starting material in each of the aqueous mixtures thereof, the temperature to which each mixture was brought at the time when examined, and the volume, in cubic centimeters, of the bottom layer of each mixture which stratified into layers. It also indicates the instances in which the aqueous PVO systems, when examined, consisted of a single cloudy liquid body and the instances in which such system was a single clear, homogeneous solution.

*Table I*

| Wt. Percent, in aqueous mixture, of— | | Appearance of aqueous liquid body or cc. of bottom layer (when formed) at— | | | |
|---|---|---|---|---|---|
| PVO | $H_2O$ | 31° C. | 52° C. | 74° C. | 99° C. |
| 0.5 | 99.5 | Cloudy | Cloudy | Cloudy | Cloudy. |
| 1 | 99 | do | do | do | 0.02. |
| 2 | 98 | 0.14 | 0.08 | 0.06 | 0.02. |
| 5 | 95 | 0.70 | 0.55 | 0.48 | Not Determined. |
| 10 | 90 | 1.60 | 1.40 | 1.20 | do. |
| 15 | 85 | 2.90 | 3.00 | 2.50 | Homogeneous. |
| 20 | 80 | Homogeneous | Homogeneous | Homogeneous | do. |
| 30 | 70 | do | do | do | do. |
| 40 | 60 | do | do | do | do. |
| 50 | 50 | do | do | do | do. |

The foregoing experiments which resulted in formation of a bottom layer of water-insoluble PVO having water dissolved therein, involved direct extraction with water of water-soluble low average molecular weight PVO from the PVO starting material, thus forming the upper layer of an aqueous PVO solution and resulting in separation of said bottom layer comprising water-insoluble PVO of higher average molecular weight.

EXAMPLE 2

A PVO starting material, having a K value of 23.8 and prepared by a conventional homopolymerization of VO, was dissolved in deionized water to form a clear, homogeneous stock solution containing 19.8 weight percent of PVO. Separate weighed portions of this stock solution were diluted by admixing therewith the respective amounts of water indicated in Table II and the resulting mixtures were permitted to settle at room temperature and stratify. The upper and lower liquid layers of each mixture were separated and weighed. The percent by weight, and also the K value, of the PVO in each layer of such mixture were determined and from the K values, the average molecular weight of the PVO in each such layer was calculated in known manner. The several values thus obtained in the respective experiments are given in Table II. In the table each entire mixture resulting from the dilution with water of a portion of the above-mentioned stock solution is referred to as being the "entire diluted mixture." Thereafter, in the table, information is given concerning the separate layers of such mixture.

cent by weight concentrations of PVO in the top and bottom layers of each mixture totaled about 35 percent, regardless of the proportion of water in the mixture as a whole. It is probable that this value represents a condition of equilibrium at room temperature between the compositions of the layers of such mixtures and that in

*Table II*

| Exp't. No. | Entire diluted mixture | | | Layers of the mixture | | PVO in the layers | | | |
|---|---|---|---|---|---|---|---|---|---|
| | Total wt., gms. | PVO therein | | Identity | Wt., gms. | Wt. percent | Gms. | K-value | Avg. molecular wt. |
| | | Wt. percent | Gms. | | | | | | |
| 1 | 20.04 | 17.82 | 3.64 | (1) | 20.04 | 17.82 | 3.64 | 23.8 | 72,000 |
| 2 | 20.73 | 15.97 | 3.31 | Top | 12.28 | 11.18 | 1.37 | 23.1 | 65,000 |
| | | | | Bottom | 8.45 | 23.80 | 2.01 | 27.3 | 105,000 |
| 3 | 20.29 | 13.95 | 2.83 | Top | 13.88 | 8.8 | 1.22 | 23.0 | 64,000 |
| | | | | Bottom | 6.42 | 26.5 | 1.70 | 26.0 | 92,000 |
| 4 | 20.61 | 12.10 | 2.49 | Top | 15.50 | 7.5 | 1.16 | 23.3 | 67,000 |
| | | | | Bottom | 4.57 | 27.8 | 1.27 | 48.7 | 540,000 |
| 5 | 19.81 | 9.80 | 1.94 | Top | 16.05 | 5.7 | 0.91 | 20.9 | 49,000 |
| | | | | Bottom | 3.76 | 29.2 | 1.09 | 49.2 | 570,000 |

[1] No layer separation.

The small discrepancies between the weight of PVO starting material employed in certain of the above individual experiments and the sum of the weights of PVO determined as being present in the two layers of the mixture obtained in the experiment indicate that these amounts were determined with an accuracy of about 97 percent or higher. It will be noted, from experiments 2-5 of the above table, that the water-insoluble PVO in the lower product layer is of higher average molecular weight than the water-soluble PVO in the upper layer and that the average molecular weight of the PVO in the bottom layer increased sharply as the percent by weight of PVO in the entire mixture was decreased, in the successive experiments, from 13.95 percent downward into values of 12.1 percent and lower. This result, in conjunction with the results shown in Table I, indicates that as the proportion of water in the mixture as a whole is increased above 85 weight percent, lower molecular weight portions of the PVO in the bottom layer of the mixture tend to be redissolved by the aqueous solution of still lower molecular weight PVO which constitutes the upper layer of the mixture. Thus, the method of the invention not only permits separation of water-insoluble PVO from the quite highly water-soluble PVO starting material, but also permits control to obtain a water-insoluble PVO product having a desired average molecular weight. It will also be noted, from Table II, that as the proportion of water in the entire mixture is increased, the proportion of water which remains dissolved in the lower layer of the mixture becomes smaller. Another interesting observation from the data in Table II, is that, at room temperature, the perinstances in which the weight percentages of PVO in the layers do not total 35 or thereabout, i.e. 35±2, either the condition of equilibrium has not been reached or the discrepancy from the value of about 35 percent is due to the presence of impurities, e.g. salts or alcohols, etc., in the aqueous mixture.

EXAMPLE 3

A PVO starting material, prepared by homopolymerizing VO and having a K value of 21, was thoroughly mixed at room temperature with water. The mixture, as a whole, contained 15 weight percent of PVO. Upon standing without stirring the mixture settled into two clear liquid layers. The upper layer was an aqueous solution of relatively low average molecular weight PVO in a concentration of 13 weight percent. The lower layer was water-insoluble PVO of higher molecular weight having water dissolved therein. This lower layer contained 22.5 weight percent of PVO. Thus, the sum of the concentrations of PVO in the two layers was 35.5 weight percent.

EXAMPLE 4

A PVO starting material, prepared by homopolymerizing VO and having a K value of 19, was employed in a series of experiments carried out in a manner otherwise similar to those described in Example 2, except as to the proportions of water admixed with the separate portions of the relatively concentrated aqueous stock solution of the PVO starting material. Values similar to those mentioned in Example 2 were determined and are set forth in Table III.

*Table III*

| Exp't. No. | Entire diluted mixture | | | Layers of the mixture | | PVO in the layers | | | |
|---|---|---|---|---|---|---|---|---|---|
| | Total wt., gms. | PVO therein | | Identity | Wt., gms. | Wt. percent | Gms. | K-value | Avg. molecular wt. |
| | | Wt. percent | Gms. | | | | | | |
| 1 | 150.1 | 13.32 | 20 | (1) | 150.1 | 13.32 | 20 | 19 | 44,000 |
| 2 | 166.7 | 12.00 | 20 | (2) | 166.7 | 12.0 | 20 | 19 | 44,000 |
| 3 | 200.1 | 10.00 | 20 | Top | 192.6 | 9.2 | 17.65 | 16.8 | 25,500 |
| | | | | Bottom | 7.5 | 25.7 | 1.93 | 22.3 | 57,000 |
| 4 | 498.7 | 8.02 | 40 | Top | 477.2 | 7.1 | 33.9 | 16.4 | 23,500 |
| | | | | Bottom | 21.5 | 28.0 | 6.02 | 21.9 | 53,500 |
| 5 | 663.3 | 6.04 | 40 | Top | 641.9 | 5.3 | 34.00 | 15.9 | 21,500 |
| | | | | Bottom | 21.4 | 29.1 | 6.22 | 23.9 | 70,000 |
| 6 | 499.9 | 4.0 | 20 | Top | 487.0 | 3.65 | 17.75 | 15.5 | 20,000 |
| | | | | Bottom | 12.9 | 31.3 | 4.04 | (2) | (2) |
| 7 | 999.9 | 2.0 | 20 | Top | 996.0 | 1.9 | 19.0 | 16.75 | 25,200 |
| | | | | Bottom | 3.9 | 35.0 | 1.3 | (2) | (2) |
| 8 | 2000.1 | 1.0 | 20 | Top | 1996.0 | 1.05 | 20.9 | 16.6 | 24,500 |
| | | | | Bottom | Trace | (2) | (2) | (2) | (2) |

[1] No layer separation. [2] Not Determined.

As will be evident from a comparison of the data in Tables II and III, the aqueous stock solution of PVO having a K value of 19 had to be rendered more dilute with added water before layer separation occurred than was the case when using the higher average molecular weight PVO starting material having a K value of 23.8, i.e. layer separation occurred at room temperature when the K 23.8 material was diluted to a stage at which the aqueous mixture contained between 17.8 and about 16 weight percent of PVO, but layer separation did not occur with the aqueous K 19 system until it was diluted to a stage at which it contained between 12 and 10 weight percent of PVO. Otherwise, the results obtained in the experiments of Table III were, in most respects, similar to those obtained in the experiments described in Example 2, particularly in Table II.

A commercial beer of good appearance, but having a slight haze, due to the presence in trace amount of impurities incident to its manufacture, is treated with 0.03 weight percent, dry PVO basis, of a water-insoluble PVO having a K value of 24 and obtained from a PVO starting material by the method of the invention as hereinbefore-described. The water-insoluble PVO of K value 24 is in water-wetted condition when added to the beer and the resulting mixture is agitated. It thereupon becomes cloudy. Upon permitting it to stand without stirring, finely divided material settles from the beer leaving the supernatent liquor clear and free of haze, i.e. of better appearance than initially.

I claim:

1. A method of producing water-insoluble homopolymers of N-vinyl-2-oxazolidinone, which comprises admixing homopolymerized N-vinyl-2-oxazolidinone, having a Fikentscher K value at least as high as 15, with water in a proportion causing the mixture, upon standing, to settle into distinct liquid layers, which proportion of water is such that the mixture as a whole contains between 2 and 17 percent by weight of homopolymerized N-vinyl-2-oxazolidinone, based on the combined weight of the same and the water present, causing the mixture to stand and form layers, and separating the layers.

2. A method, as set forth in claim 1, wherein the lower layer, which comprises water-insoluble homopolymeric poly(N-vinyl-2-oxazolidinone), is dried.

3. A method of producing water-insoluble homoplymers of N-vinyl-2-oxazolidinone, which comprises dissolving in water homopolymerized N-vinyl-2-oxazolidinone, having a Fikentscher K value of at least 15 and comprising homopolymeric poly - (N - vinyl-2-oxazolidinone) molecules of molecular weights ranging from below 18,000 to considerably above 18,000, to form a relatively concentrated aqueous solution thereof, thereafter diluting the solution with water in amount sufficient to cause it, upon standing without agitation, to settle and form distinct liquid layers, the upper of which is an aqueous solution of homopolymeric poly-(N-vinyl-2-oxazolidinone) of relatively low average molecular weight and the lower of which layers comprises water-insoluble homopolymeric poly-(N-vinyl-2-oxazolidinone) of higher average molecular weight having water dissolved therein, the proportion of water in the thus-diluted mixture being such that the diluted mixture as a whole contains between 2 and 17 percent by weight of the homopolymeric material, based on the combined weight of the same and the water, causing the mixture to settle and form such layers, and separating the layers.

4. A method as set forth in claim 3, wherein the lower layer, after being separated from the upper layer, is dried.

5. A method which comprises producing water-insoluble homopolymeric poly-(N-vinyl-2-oxazolidinone) by admixting homopolymerized N-vinyl-2-oxazolidinone, having a Fikentscher K value at least as high as 15 and comprising homopolymer molecules of molecular weights ranging from less than 18,000 to considerably higher than 18,000, with water in a proportion causing the mixture, upon standing, to settle into distinct layers, which proportion of water is such that the mixture as a whole contains between 2 and 17 percent by weight of homopolymerized poly-(N-vinyl-2-oxazolidinone), based on the combined weight of the same and the water, causing the mixture to stand and form layers, the upper layer being an aqeuous solution of homopolymeric poly-(N-vinyl-2-oxazolidinone) of relatively low average molecular weight and the lower layer being water-insoluble and comprising water-insoluble homopolymeric poly(N-vinyl-2- oxazolidinone) of a higher average molecular weight, and separating the layers, whereby a water-insoluble homopolymeric poly-(N-vinyl-2-oxazolidinone) product is obtained, and thereafter dissolving the water-insoluble homopolymeric poly-(N-vinyl-2-oxazolidinone) in an aqueous solution of at least one salt selected from the group consisting of water-soluble alkali salts and water-soluble alkaline earth metal salts in a total salt concentration of at least 0.3 normal.

6. An aqueous solution of both a water-insoluble homopolymeric poly-(N-vinyl-2-oxazolidinone) and at least one salt selected from the class consisting of water-soluble alkali salts and water-soluble alkaline earth metal salts, the total concentration of such salt material in the water present being at least 0.3 normal.

References Cited by the Examiner

UNITED STATES PATENTS 2,847,407  8/58  Hosmer _____ 260—88.3

OTHER REFERENCES

Jirgensons, Journal of Polymer Science, vol. VIII, No. 5, May 1952, pages 519–527 at 521.

Derwent Belgian Abstract Report, vol. 65B, No. 584, 468, September 1959.

LEON J. BERCOVITZ, *Primary Examiner.*

H. N. BURSTEIN, *Examiner.*

UNITED STATES PATENT OFFICE
CERTIFICATE OF CORRECTION

Patent No. 3,206,423  September 14, 1965

Wilhelm E. Walles

It is hereby certified that error appears in the above numbered patent requiring correction and that the said Letters Patent should read as corrected below.

Columns 7 and 8, Table III, fifth column, line 2 thereof, for the footnote "(2)" read -- (1) --.

Signed and sealed this 26th day of July 1966.

(SEAL)
Attest:

ERNEST W. SWIDER
Attesting Officer

EDWARD J. BRENNER
Commissioner of Patents